(12) United States Patent
Cheng et al.

(10) Patent No.: US 10,257,405 B2
(45) Date of Patent: Apr. 9, 2019

(54) AUTOMATIC FOCUSING METHOD AND AUTOMATIC FOCUSING SYSTEM

(71) Applicant: NANNING FUGUI PRECISION INDUSTRIAL CO., LTD., Nanning (CN)

(72) Inventors: Pi-Lun Cheng, New Taipei (TW); Hsuan-Kuei Huang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 334 days.

(21) Appl. No.: 14/986,850

(22) Filed: Jan. 4, 2016

(65) Prior Publication Data

US 2017/0171457 A1 Jun. 15, 2017

(30) Foreign Application Priority Data

Dec. 11, 2015 (TW) ............................. 104141832 A

(51) Int. Cl.
| | | |
|---|---|---|
| *H04N 5/232* | (2006.01) | |
| *G06T 7/60* | (2017.01) | |
| *G06K 9/52* | (2006.01) | |
| *G06K 9/46* | (2006.01) | |
| *G06T 7/40* | (2017.01) | |
| *G06K 9/00* | (2006.01) | |

(52) U.S. Cl.
CPC ..... *H04N 5/23212* (2013.01); *G06K 9/00369* (2013.01); *G06K 9/4652* (2013.01); *G06K 9/4661* (2013.01); *G06K 9/52* (2013.01); *G06K 2009/4666* (2013.01); *G06T 2207/30196* (2013.01)

(58) Field of Classification Search
CPC .. H04N 5/23212; G06K 9/52; G06K 9/46611; G06K 9/4652; G06T 7/408; G06T 7/602
USPC .......................................................... 348/77
See application file for complete search history.

(56) References Cited

U.S. PATENT DOCUMENTS

| | | | |
|---|---|---|---|
| 5,159,383 A | 10/1992 | Ishida et al. | |
| 2008/0309789 A1 | 12/2008 | Nakami | |
| 2015/0009355 A1 | 1/2015 | Peng | |
| 2016/0358338 A1* | 12/2016 | Tsunoda | ............... G06K 9/6267 |

FOREIGN PATENT DOCUMENTS

| | | |
|---|---|---|
| CN | 101547306 A | 9/2009 |
| CN | 101662581 A | 3/2010 |
| CN | 102033388 A | 4/2011 |
| CN | 102169276 A | 8/2011 |
| CN | 102194108 A | 9/2011 |
| CN | 103544478 A | 1/2014 |
| CN | 104486552 A | 4/2015 |

(Continued)

*Primary Examiner* — Hee-Yong Kim
(74) *Attorney, Agent, or Firm* — ScienBiziP, P.C.

(57) ABSTRACT

An automatic focus method includes: catching an image data in a focus area; calculating the image data to get a contrast value curve via a contrast value algorithm; obtaining a contrast weight of each contrast value; calculating an adapted contrast value by multiplying the contrast value to the contrast weight; and adapting the focus according to the adapted contrast value curve. An automatic focus system using the automatic focus method is further disclosed.

8 Claims, 10 Drawing Sheets

(56) References Cited

FOREIGN PATENT DOCUMENTS

| | | |
|---|---|---|
| CN | 104994376 A | 10/2015 |
| TW | 201503692 | 1/2015 |
| WO | 2013005489 | 1/2013 |

* cited by examiner

AUTOMATIC FOCUSING METHOD AND AUTOMATIC FOCUSING SYSTEM

FIELD

The subject matter herein generally relates to automatic focusing methods and automatic focusing systems.

BACKGROUND

Currently, a video can be focus passively on an object. The video can generally focus by finding a peak value of a contrast value curve via movement of a focus lens.

BRIEF DESCRIPTION OF THE DRAWINGS

Implementations of the present technology will now be described, by way of example only, with reference to the attached figures.

DETAILED DESCRIPTION

Figure 1:
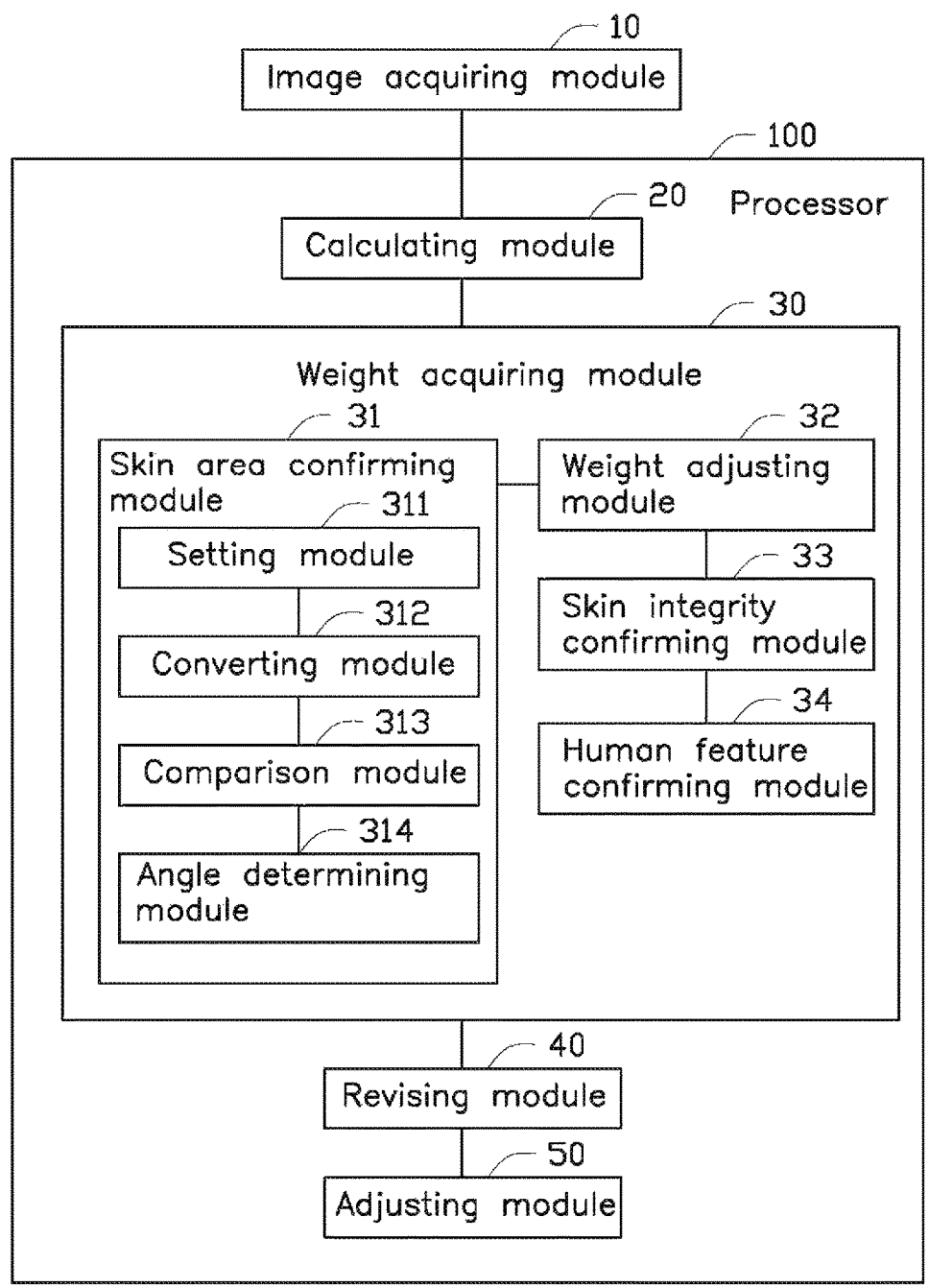
FIG. 1 is a block diagram of one embodiment of an automatic focusing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates an automatic focusing system in accordance with an embodiment. The automatic focusing system can include an image acquiring module 10 and a processor 100, such as micro control unit (MCU) or central processing unit (CPU). The image acquiring module 10 is configured to acquire an image data in a focus area.

Figure 2:
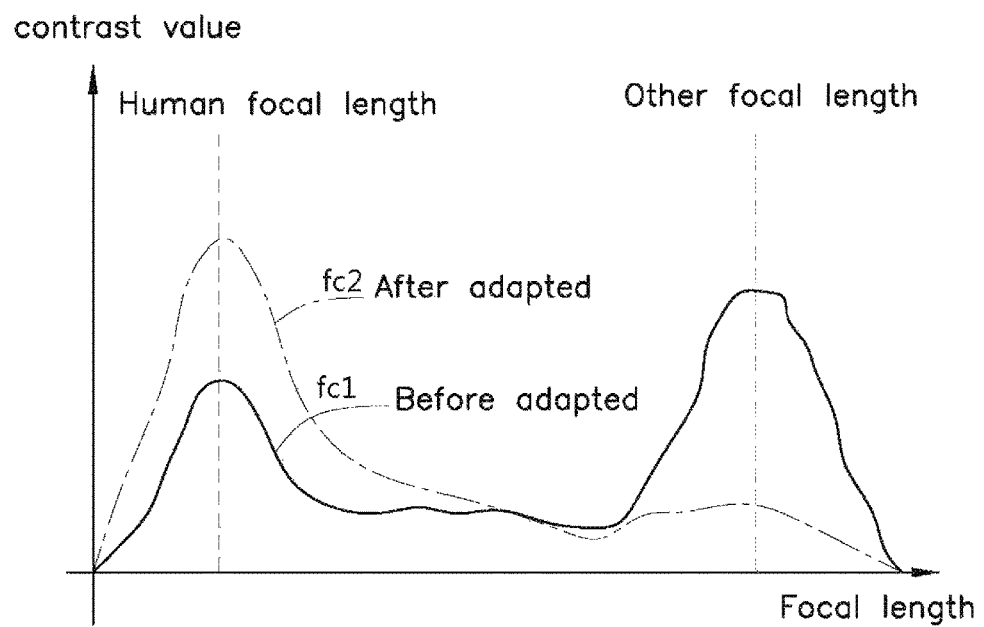
FIG. 2 is a comparison diagram of contrast value curves before and after adaption of the automatic focusing system of FIG. 1.

The processor 100 can include a calculating module 20, a weight acquiring module 30, a revising module 40, and an adjusting module 50. The calculating module 20 is configured to calculate the image data to get a contrast value (CV) curve fc1 (shown as in FIG. 2) by a contrast value algorithm. The weight acquiring module 30 is configured to fetch a contrast weight of each contrast value. The revising module 40 is configured to calculate an adapted contrast value by multiplying the contrast value with the contrast weight. The adjusting module 50 is configured to adapt the focus according to the adapted contrast value curve fc2 (shown as in FIG. 2). In at least one embedment, the contrast value algorithm is the Tenengrad algorithm.

In performing the Tenengrad algorithm, assuming a size of the image is X×Y, x,y is image coordinate, Gx & Gy are Sobel operand, FTenengrad is contrast value. Gx, Gy, and FTenengrad are represented below:

$$G_x = \begin{bmatrix} -1 & 0 & 1 \\ -2 & 0 & 2 \\ -1 & 0 & 1 \end{bmatrix}, G_y = \begin{bmatrix} 1 & 2 & 1 \\ 0 & 0 & 0 \\ -1 & -2 & -1 \end{bmatrix}$$

$$F_{Tenengrad} = \sum_{x=1}^{X} \sum_{y=1}^{Y} |G_x * I(x,y)| + |G_y * I(x,y)|$$

The image is cut to J×K=Q blocks, j,k is block coordinate, a contrast value of each block is CVblock(j,k), the contrast value of whole image is CVframe, w(x,y) is a weight of each contrast value. CVframe and CVblock are represented below:

$$CV_{frame} = \sum_{j=1}^{J} \sum_{k=1}^{K} c_N \times CV_{block}(j,k)$$

$$CV_{block}(j,k) = \sum_{x=\frac{X}{J}(j-1)+1}^{\frac{X}{J}j} \sum_{y=\frac{Y}{K}(k-1)+1}^{\frac{Y}{K}k} [|G_x * I(x,y)| + |G_y * I(x,y)|] \times w(x,y)$$

The weight acquiring module 30 is configured to perform a hue focal weighting and a feature focal emphasizing. The hue focal weighting is configure to set an increase hue factor (IHF) and a decrease eliminate factor (DEF) as an adapted CV weighting, which is configured to adapt the Tenengrad algorithm, according to a skin color and a focal point. The feature focal emphasizing is configured to set a increase anthropomorphic factor (IAF) and a decrease resemble object factor (DROF) as another adapted CV weighting, which is configured to confirm whether the adapted CV weighting in the hue focal weighting is correct, according to human features.

The weight acquiring module 30 can include a skin area confirming module 31, which is configured to determine whether the focus area is a skin area; a weight adjusting module 32, which is configured to set DEF to decrease contrast weights corresponding to the non-skin area; a skin integrity confirming module 33, which is configured to determine whether the skin area is integrated; and a human feature confirming module 34, which is configured to determine whether the non-integrated skin area accords with human features. The weight adjusting module 32 is further configured to set the IAF to increase the corresponding contrast weights of the integrated skin area. The weight adjusting module 32 is further configured to set the IHF to increase the corresponding contrast weights of human feature skin area and configured to set the DROP to decrease the corresponding contrast weights of non-human feature skin area.

The skin area confirming module 31 can include a setting module 311, configured to set a determining area; a converting module 312, configured to convert each pixel in the focus area to the HIS model (shown as in FIG. 3), to get a hue angle of each pixel; a comparison module 313, configured to compare the hue angle with the determining area; and an angle determining module 314, configured to determine the focus area is the skin area when the hue angle is located in the determined area and determine the focus area is non-skin area when the hue angle is not located in the determined area.

Figure 3:
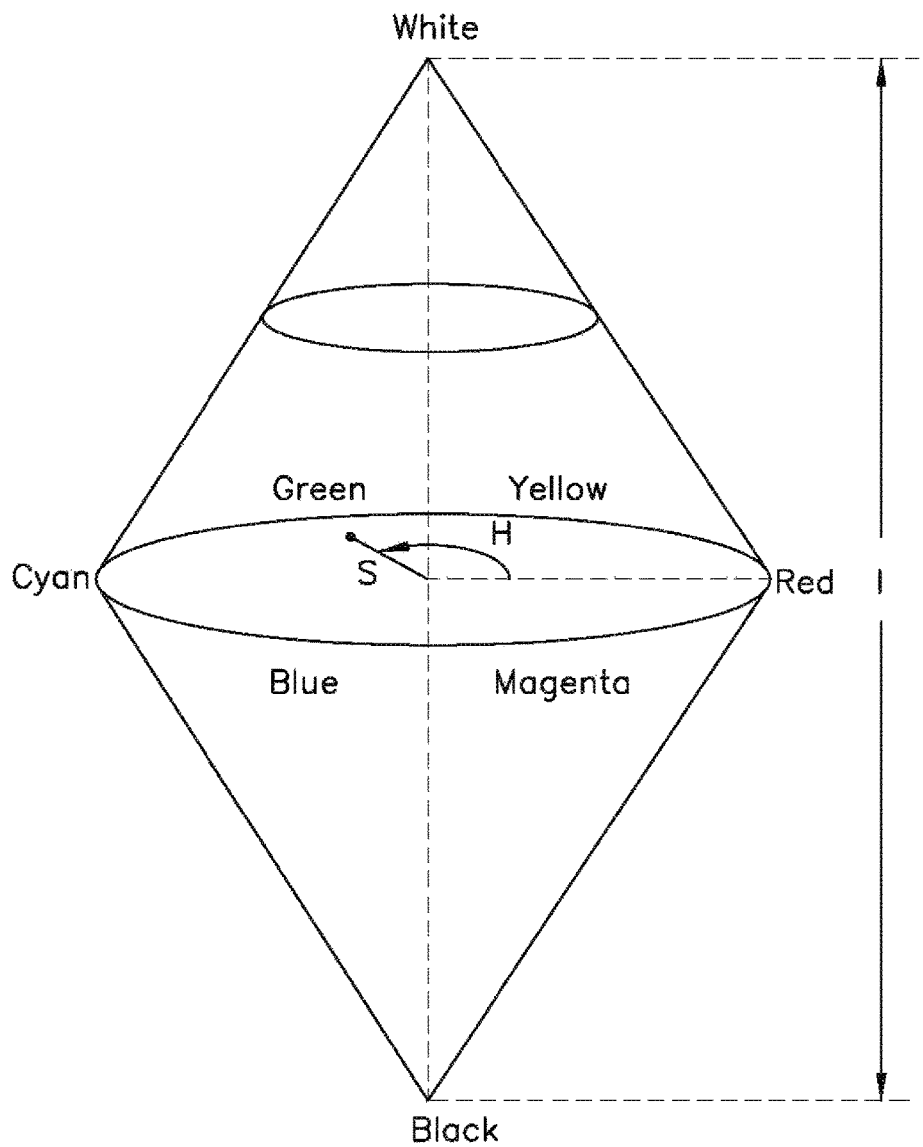
FIG. 3 is a diagram of a hue-saturation-intensity (HSI) model.

Referring to FIG. 3, $$H = \begin{cases} \theta & B \leq G \\ 360 - \theta & B > G \end{cases}$$

$$\theta = \cos^{-1}\left\{\frac{[(R-G)+(R-B)]}{2 \times \sqrt{(R-G)^2 + (R-B)(G-B)}}\right\}$$

$$S = 1 - \frac{3 \cdot \min(R, G, B)}{R+G+B}$$

$$I = (R+G+B)/3$$

Figure 4:
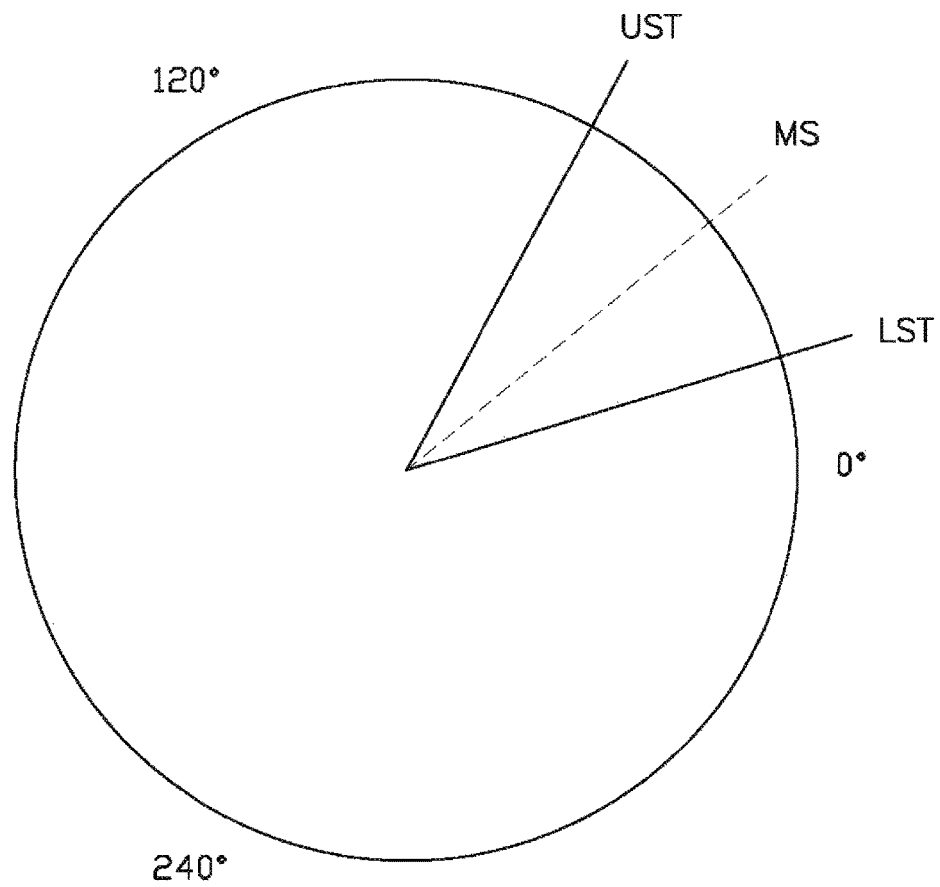
FIG. 4 is a diagram showing a contrasted pixel hue angle.

Referring to FIG. 4, UST is defined as upper skin thd, and the UST<60°, the LST is defined as lower skin thd, and the LST>0°, the MS is middle skin thd, and $$MS = \frac{UST + LST}{2}.$$

$$I(x,y) = \{I(x,y)_{Blue}, I(x,y)_{Green}, I(x,y)_{Red}\}$$

$$H_{value}(x,y) = \begin{cases} \theta, & I(x,y)_{Blue} \leq I(x,y)_{Green} \\ 360 - \theta, & I(x,y)_{Blue} > I(x,y)_{Green} \end{cases}$$

$$\theta = \cos^{-1}\left\{\frac{([I(x,y)_{Red} - I(x,y)_{Green}] + [I(x,y)_{Red} - I(x,y)_{Blue}])}{2 \times \sqrt{\begin{array}{c}[I(x,y)_{Red} - I(x,y)_{Green}]^2 + \\ [I(x,y)_{Red} - I(x,y)_{Blue}] \times [I(x,y)_{Green} - I(x,y)_{Blue}]\end{array}}}\right\}$$

The $IHF = \frac{[MS - |H_{value}(x,y) - MS|]}{MS} \times \alpha_2$

The $DEF = \frac{\min\{|H_{value}(x,y) - MS|, |H_{value}(x,y) - 360 - MS|\}}{180} \times \beta_2$ The $DROF = \frac{|H_{value}(x,y) - MS|}{180} \times \beta_1$ The $IAF = \frac{[MS - |H_{value}(x,y) - MS|]}{MS} \times \alpha_1$ $\alpha_1, \beta_1, \alpha_2, \beta_2,$ are constant for normalization, γ is human object adjust coefficient.

The adapted CV weight of the non-skin area w(x, y)=DEF×fc1+γ;

The adapted CV weight of the integrated skin area w(x, y)=IAF×fc1;

The adapted CV weight of the human feature skin area w(x, y)=IHF×fc1;

The adapted CV weight of the human feature skin area w(x, y)=DROF×fc1.

$$CV_{frame} = \sum_{j=1}^{J} \sum_{k=1}^{K} c_N \times CV_{block}(j,k)$$

$$CV_{block}(j,k) = \sum_{x=\frac{X}{J}(j-1)+1}^{\frac{X}{J}j} \sum_{y=\frac{Y}{K}(k-1)+1}^{\frac{Y}{K}k} [|G_x * I(x,y)| + |G_y * I(x,y)|] \times w(x,y)$$

The CVframe can be calculated, and the adapted CV curve fc2 can be acquired, and a new focus can be adjusted according to the adapted CV curve fc2.

Figure 5:
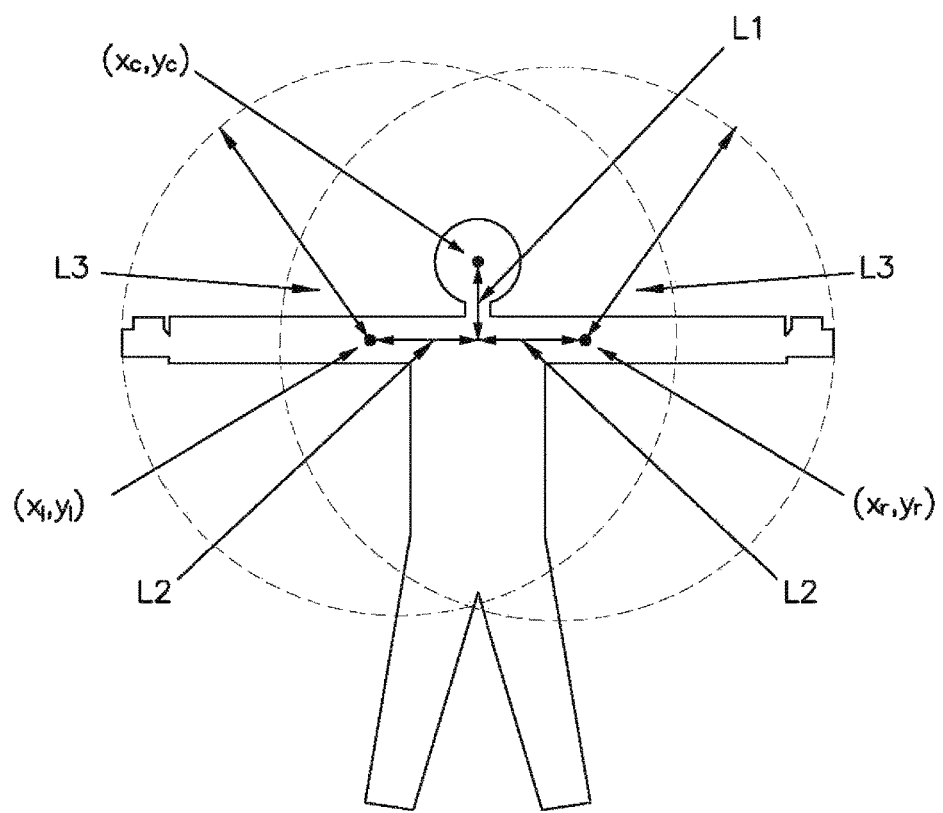
FIG. 5 is a diagram showing a preset scan area.

Referring to FIG. 5, the skin integrity confirming module 33 is configured to find the center of the skin area to be center coordinates (xc, yc); extend a preset length L1 downwards, the preset length L1 is greater than half of a preset head length but less than the preset head length; respectively extend left and right a preset shoulder length L2 to get two preset shoulder coordinates (xl, yl) and (xr, yr); respectively draw a circle in a center of circle of (xl, yl) and (xr, yr) and a radius of a preset arm length L3, and confirm the set of the two circles to the scan area and it is determined whether there is one or two arm areas in the scan area and when there is one or two arm areas in the scan area, confirm the scan area is skin, when there is no arm areas in the scan area, the scan area is confirmed as non-skin area, and when there is more than two arm areas, the scan area is adjusted by adjusting the preset head length, the preset shoulder length L2, or/and the preset arm length L3.

The human feature confirming module 34 is configured to determine whether the skin area accords with the human features by determining whether the skin area is shining or moving. When the skin area is shining, the weight adjusting module 32 decreases the corresponding contrast weight. When the skin area is not shining, the human feature confirming module 34 determines whether the non-shining area is moving if yes, the weight adjusting module 32 increases the corresponding contrast weight, if no, the weight adjusting module 32 decreases the corresponding contrast weight.

Figure 6:
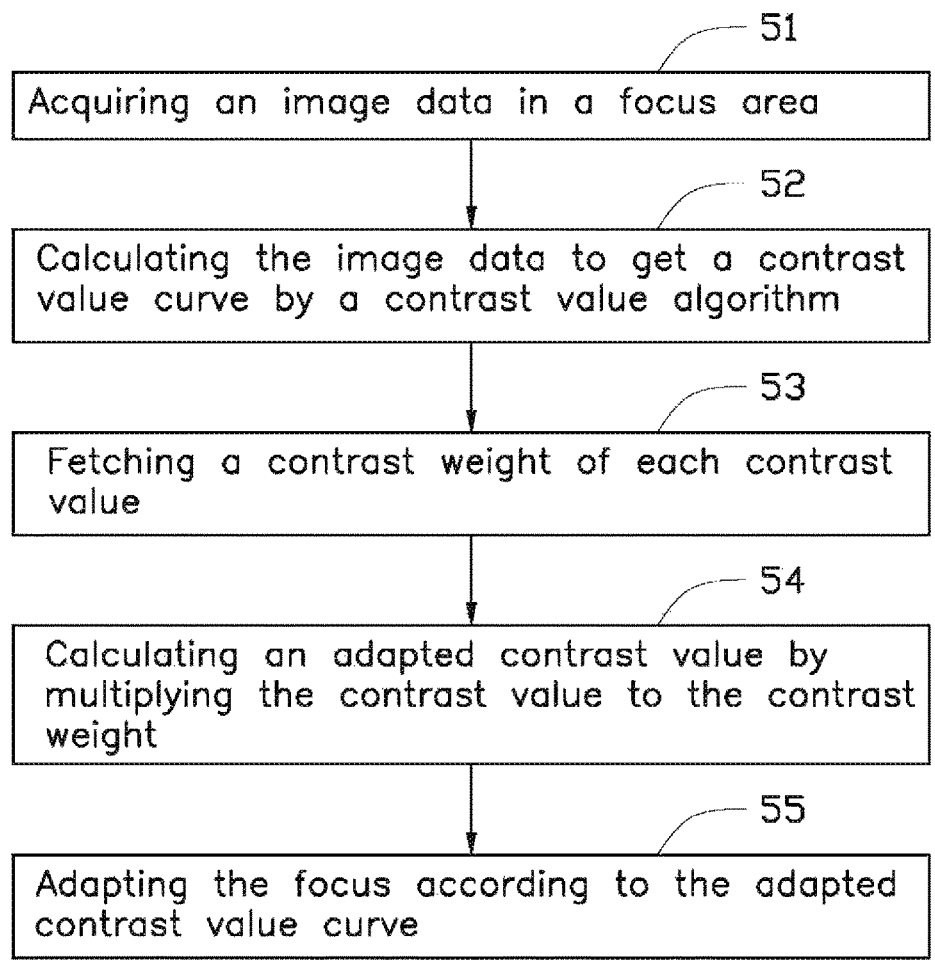
FIG. 6 is a flowchart of one embodiment of an automatic focusing method.

Referring to FIG. 6, a flowchart is presented in accordance with an example embodiment of automatic focusing method. The example method is provided by way of example, as there are a variety of ways to carry out the method. The method described below can be carried out using the configurations illustrated in FIGS. 1-5, for example, and various elements of these figures are referenced in explaining the example method. Each block shown in FIG. 6 represents one or more processes, methods, or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method can begin at block 51.

At block 51, acquiring an image data in a focus area by the image acquiring module 10;

At block 52, calculating the image data to get a contrast value curve by a contrast value algorithm by the calculating module 20;

At block 53, fetching a contrast weight of each contrast value by the weight acquiring module 30;

At block 54, calculating an adapted contrast value by multiplying the contrast value to the contrast weight by the revising module 40; and At block 55, adapting the focus according to the adapted contrast value curve by the adjusting module 50.

Figure 7:
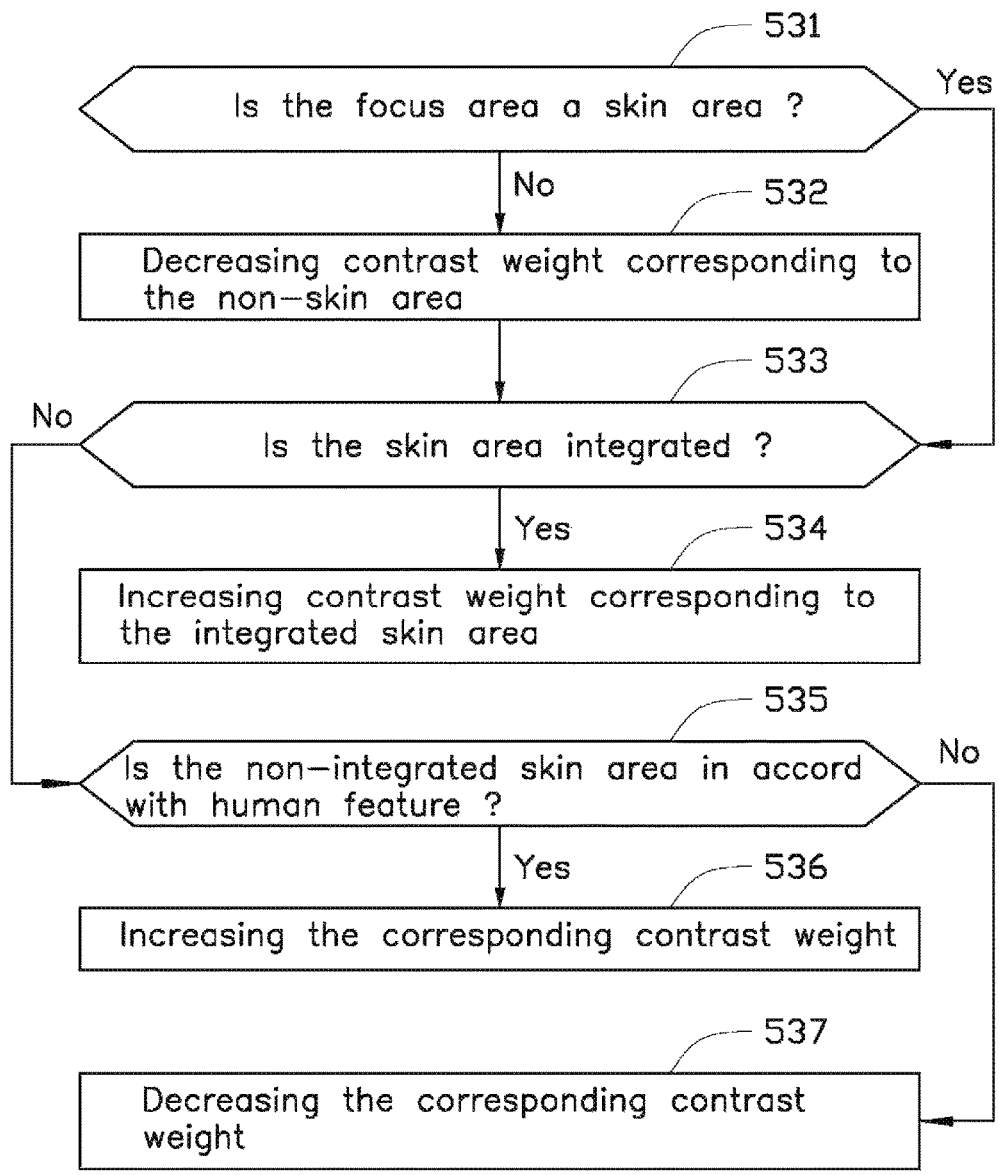
FIG. 7 is a flowchart of one embodiment of a step 53 of the automatic focusing method of FIG. 6.

Referring to FIG. 7, the block 53 can begin at block 531.

At block 531, determining whether the focus area is a skin area by the skin area confirming module 31, if yes, performing block C3; if no, performing block 532;

At block 532, decreasing contrast weight corresponding to the non-skin area by the weight adjusting module 32;

At block 533, determining whether the skin area is integrated, if yes, performing block 534 by the skin integrity confirming module 33, if no, performing block 535;

At block 534, increasing contrast weight corresponding to the integrated skin area by the weight adjusting module 32;

At block 535, determining whether the non-integrated skin area is in accordance with human feature by the human feature confirming module 34, if yes, performing block 536, if no, performing block 537;

At block 536, increasing the corresponding contrast weight by the weight adjusting module 32; and At block 537, decreasing the corresponding contrast weight by the weight adjusting module 32.

Figure 8:
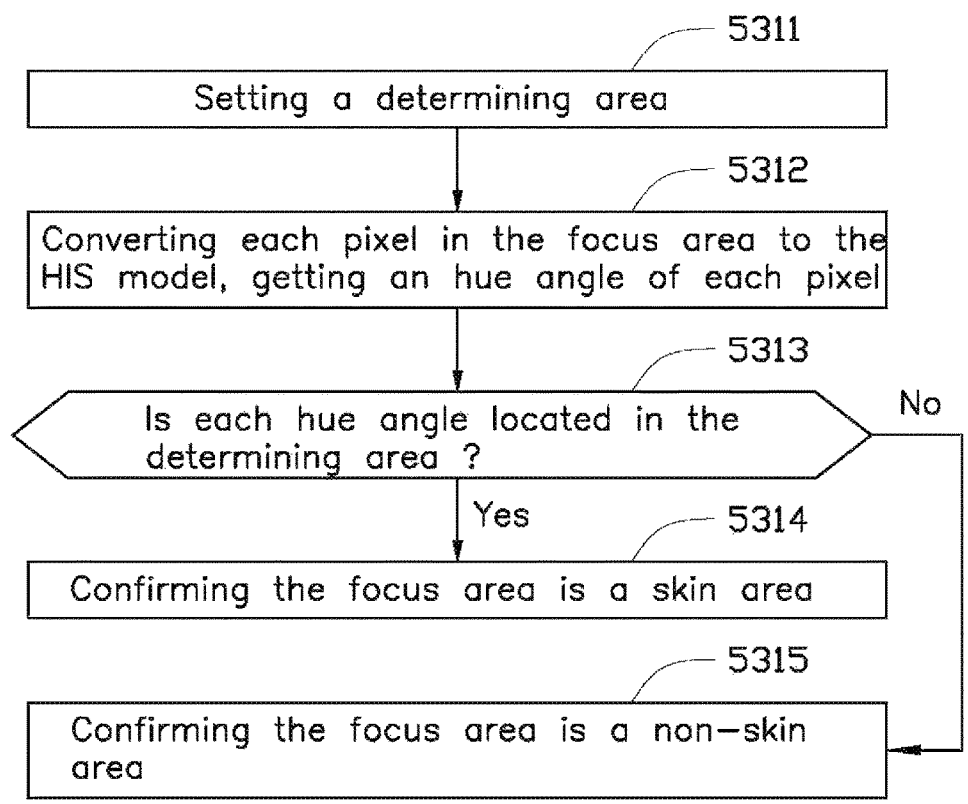
FIG. 8 is a flowchart of one embodiment of a step 531 of the automatic focusing method of FIG. 7.

Referring to FIG. 8, the block 531 can begin at block 5311.

At block 5311, setting a determining area by the setting module 311;

At block 5312, converting each pixel in the focus area to the HIS model, getting an hue angle of each pixel by the converting module 312;

At block 5313, comparing each hue angle is located in the determining area by the comparison module 313, if yes, performing block 5314, if no, performing block 5315;

At block 5314, confirming the focus area is a skin area by the angle determining module 314;

At block 5315, confirming the focus area is a non-skin area by the angle determining module 314.

Figure 9:
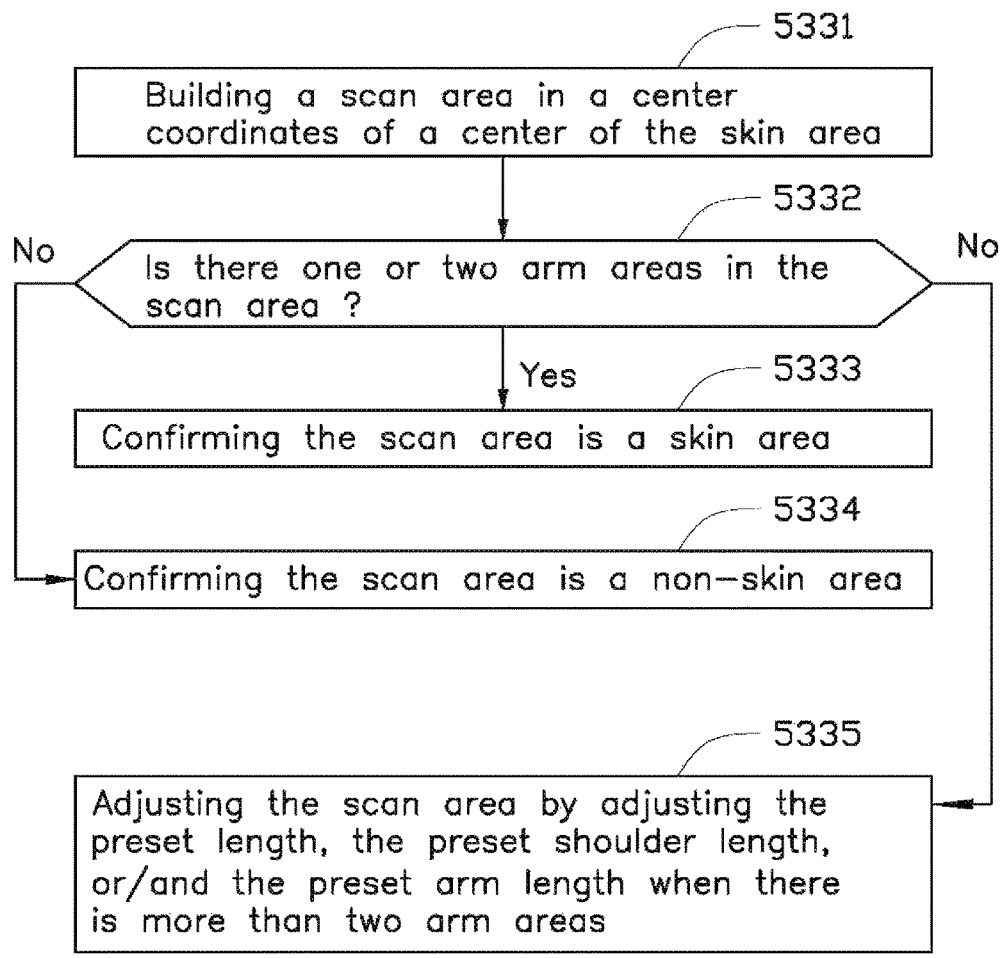
FIG. 9 is a flowchart of one embodiment of a step 533 of the automatic focusing method of FIG. 7.

Referring to FIG. 9, the block 533 can begin at block 5331.

At block 5331, building a scan area in a center coordinates of a center of the skin area by the skin integrity confirming module 33;

At block 5332, determining whether there is one or two arm areas in the scan area by the skin integrity confirming module 33, if yes, performing block 5333, if no, performing block 5334;

At block 5333, confirming the scan area is a skin area by the skin integrity confirming module 33;

At block 5334, confirming the scan area is a non-skin area by the skin integrity confirming module 33.

The block 5331 includes: finding out the center of the skin area to be the center coordinates (xc, yc); extending a preset length downwards; respectively extending left and right a preset shoulder length to get two preset shoulder coordinates (xl, yl) and (xr, yr); respectively drawing a circle in a center of circle of (xl, yl) and (xr, yr) and a radius of a preset arm length; and confirming the set of the two circles to the scan area by the skin integrity confirming module 33.

The block 533 further includes block 5335, adjusting the scan area by adjusting the preset length, the preset shoulder length, or/and the preset arm length when there is more than two arm areas by the skin integrity confirming module 33.

Figure 10:
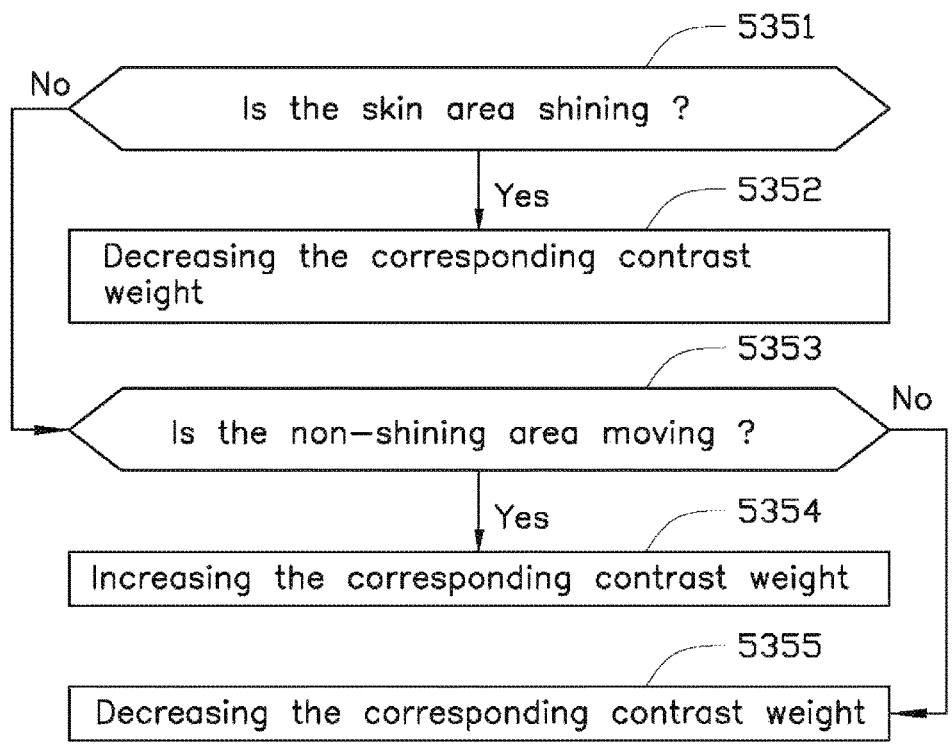
FIG. 10 is a flowchart of one embodiment of a step 535 of the automatic focusing method of FIG. 7.

Referring to FIG. 10, the block 535 can begin at block 5351.

At block 5351, determining whether the skin area is shining by the human feature confirming module 34, if yes, performing block 5352, is no, performing block 5353;

At block 5352, decreasing the corresponding contrast weight by the weight adjusting module 32;

At block 5353, determining whether the non-shining area is moving by the human feature confirming module 34, if yes, performing block 5354, if no, performing block 5355;

At block 5354, increasing the corresponding contrast weight by the weight adjusting module 32; and At block 5355, decreasing the corresponding contrast weight by the weight adjusting module 32.

The embodiments shown and described above are only examples. Many details are often found in the art such as the other features of an automatic focusing system and method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An automatic focusing method comprising:
acquiring an image data in a focus area;
calculating the image data to get a contrast value curve by a contrast value algorithm;
acquiring a contrast weight of each contrast value, wherein acquiring a contrast weight of each contrast value comprising:
determining whether the focus area is a skin area;
decreasing contrast weight corresponding to the non-skin area;
determining whether the skin area is integrated;
increasing contrast weight corresponding to the integrated skin area;
determining whether the non-integrated skin area accords with human feature;
increasing the corresponding contrast weight when the non-integrated skin area accords with human feature;
decreasing the corresponding contrast weight when the non-integrated skin area does not accord with human feature;
calculating an adapted contrast value by multiplying the contrast value to the contrast weight; and
adapting the focus according to the adapted contrast value curve.

2. The automatic focusing method of claim 1, wherein determining whether the focus area is a skin area comprising:
setting a determining area;
converting each pixel in the focus area to the HIS model, getting a hue angle of each pixel;
comparing each hue angle located in the determining area;
confirming the focus area a skin area when the hue angle is located in the determining area; and
confirming the focus area a non-skin area when the hue angle is not located in the determining area.

3. The automatic focusing method of claim 1, wherein determining whether the skin area is integrated comprising:
building a scan area in a center coordinates of a center of the skin area;

determining whether there is one or two arm areas in the scan area;

confirming the scan area is a skin area when there is one or two arm areas in the scan area; and confirming the scan area is a non-skin area when there is no arm area in the scan area.

4. The automatic focusing method of claim 3, wherein building a scan area in a center coordinates of a center of the skin area further comprising: finding out the center of the skin area to be the center coordinates (xc, yc); extending a preset length downwards; respectively extending left and right a preset shoulder length to get two preset shoulder coordinates (xl, yl) and (xr, yr); respectively drawing a circle in a center of circle of (xl, yl) and (xr, yr) and a radius of a preset arm length; and confirming the set of the two circles to the scan area.

5. The automatic focusing method of claim 4, wherein determining whether the skin area is integrated further comprising: adjusting the scan area by adjusting the preset length, the preset shoulder length, or/and the preset arm length when there is more than two arm areas.

6. The automatic focusing method of claim 1, wherein determining whether the non-integrated skin area accords with human feature comprising:

determining whether the skin area is shining;

decreasing the corresponding contrast weights when the skin area is shining;

determining whether the non-shining area is moving;

increasing the corresponding contrast weights when the non-shining area is moving; and decreasing the corresponding contrast weights when the non-shining area is not moving.

7. An automatic focusing system comprising:

an image acquiring module, configured to acquire an image data in a focus area; and a processor comprising:

a calculating module, configured to calculate the image data to get a contrast value curve by a contrast value algorithm;

a weight acquiring module, configured to acquire a contrast weight of each contrast value, wherein the weight acquiring module comprising:

a skin area confirming module, configured to determine whether the focus area is a skin area;

a weight adjusting module, configured to decrease contrast weights corresponding to the non-skin area;

a skin integrity confirming module, configured to determine whether the skin area is integrated;

a human feature confirming module, configured to determining whether the non-integrated skin area accords with human feature, wherein the weight adjusting module is further configured to increase contrast weights corresponding to the integrated skin area; increase the corresponding contrast weights when the non-integrated skin area accords with human feature; and decrease the corresponding contrast weights when the non-integrated skin area does not accord with human feature;

a revising module, configured to calculate an adapted contrast value by multiplying the contrast value to the contrast weight; and an adjusting module, configured to adapt the focus according to the adapted contrast value curve.

8. The automatic focusing system of claim 7, wherein the skin area confirming module comprising:

a setting module, configured to set a determining area;

a converting module, configured to convert each pixel in the focus area to the HIS model, getting a hue angle of each pixel;

a comparison module, configured to compare whether each hue angle is located in the determining area; and an angle determining module, configured to confirm the focus area a skin area when the hue angle is located in the determining area, and confirm the focus area a non-skin area when the hue angle is not located in the determining area.

* * * * *